United States Patent
Brothers

(10) Patent No.: US 7,552,433 B2
(45) Date of Patent: Jun. 23, 2009

(54) NON-PLATFORM-SPECIFIC UNIQUE INDENTIFIER GENERATION

(75) Inventor: William G. Brothers, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 951 days.

(21) Appl. No.: 10/704,592

(22) Filed: Nov. 12, 2003

(65) Prior Publication Data

US 2005/0102672 A1 May 12, 2005

(51) Int. Cl.
*G06F 9/455* (2006.01)
*G06F 9/46* (2006.01)
*G06F 15/16* (2006.01)
*G06F 17/30* (2006.01)

(52) U.S. Cl. .......................... 718/1; 718/100; 718/108; 709/201; 709/217; 709/231; 707/203

(58) Field of Classification Search ............. 718/1–108; 707/1–206; 709/201, 217, 223, 227, 228, 709/231
See application file for complete search history.

(56) References Cited

U.S. PATENT DOCUMENTS

| | | | |
|---|---|---|---|
| 4,754,395 A | 6/1988 | Weisshaar et al. | |
| 4,949,254 A * | 8/1990 | Shorter | 718/106 |
| 5,893,118 A * | 4/1999 | Sonderegger | 707/203 |
| 6,047,332 A | 4/2000 | Viswanathan et al. | |
| 6,125,382 A | 9/2000 | Brobst et al. | |
| 6,292,904 B1 * | 9/2001 | Broomhall et al. | 714/1 |
| 6,453,392 B1 * | 9/2002 | Flynn, Jr. | 711/151 |
| 6,725,252 B1 * | 4/2004 | Mall et al. | 709/203 |
| 6,754,890 B1 * | 6/2004 | Berry et al. | 717/128 |
| 6,768,947 B2 * | 7/2004 | Diller | 702/14 |
| 7,143,091 B2 * | 11/2006 | Charnock et al. | 707/5 |
| 7,246,141 B2 * | 7/2007 | Wolczko et al. | 707/205 |
| 2002/0156767 A1 * | 10/2002 | Costa et al. | 707/1 |
| 2003/0110416 A1 | 6/2003 | Morrison et al. | |
| 2003/0195959 A1 * | 10/2003 | Labadie et al. | 709/224 |
| 2003/0221023 A1 * | 11/2003 | Peddada et al. | 709/330 |
| 2004/0268314 A1 * | 12/2004 | Kollman et al. | 717/128 |
| 2005/0050106 A1 * | 3/2005 | Wenner et al. | 707/200 |

FOREIGN PATENT DOCUMENTS

WO 02/075527 A2 9/2002

OTHER PUBLICATIONS

N. Narasimhan; Transparent Consistent Replication of Java RMI Objects; IEEE Conference Proceeding 2000.*
I. H. Kazi, D. P. Jose; Javiz: A Client/server Java Profiling tool;IBM System Journal, vol. 39, No. 1, 2000.*

(Continued)

*Primary Examiner*—Van H Nguyen
*Assistant Examiner*—Abdullah Al Kawsar

(57) ABSTRACT

A method of generating a unique identifier without requiring platform-specific software, a computer readable medium embodying instructions for implementing the method, and a system therefor are described. In response to an event occurrence on a computer system, execution of the method retrieves an event timestamp from an intermediate operating environment on the computer system. Further execution of the method retrieves a system name and a hash value from the intermediate operating environment on the computer system. The combination of the system name, event timestamp, and hash value creates a unique identifier uniquely identifying the intermediate operating environment on the computer system without requiring platform-specific software.

15 Claims, 3 Drawing Sheets

OTHER PUBLICATIONS

Paul J. Leach, Microsoft; Rich Salz, Certco Network Working Group Internet-Draft http://ftp.ics.uci.edu/pub/ietf/webdav/uuid-guid/draft-leach-uuids-guids-01.txt.

Narasimhan N et al; Transparent consistent replication of Java RMI objects, Distributed Objects and Applications, 2000. Proceedings. Sep. 21, 2000, pp. 17-26, p. 08.1.

* cited by examiner

NON-PLATFORM-SPECIFIC UNIQUE INDENTIFIER GENERATION

FIELD OF THE INVENTION

The present invention relates to a method of and apparatus for generating a unique identifier in non-platform-specific software.

BACKGROUND

Computers are complex systems made up of numerous components, e.g. executable software and hardware components for executing the software. Executable software components include operating systems, device drivers, and software applications. Protocols specify how two or more components communicate. Because of the multitude of hardware and software component designs and manufacturers, many components are incompatible. For example, the majority of software applications are specific to a particular operating system and are not executable by another operating system. Even if the underlying source code is generalized sufficiently to be compiled for different operating systems, the resulting software application cannot be transferred from one operating system to another without requiring a compilation of the source code for the new operating system.

Designers of executable software for a specific operating system must bear this situation in mind when designing and writing executable software applications. One approach is to create software applications for execution by a single particular operating system, such as WINDOWS 2000 available from Microsoft Corp, on a particular hardware system. The combination of operating system and computer hardware is referred to as a platform. In this approach, the software application will not be portable to other operating systems, for example, operating system-specific software applications designed for execution by a WINDOWS 2000 operating system is not executable by a MACINTOSH operating system available from Apple Computer, Inc., and vice versa.

Another approach is to design software applications to utilize an intermediate executable software component, i.e., an intermediate operating environment, providing an interface between the software application and the operating system. The most common example of an intermediate component is a virtual machine, for example a JAVA virtual machine (JAVA VM or JVM). JAVA is available from Sun Microsystems. While a JAVA VM must be tailor-written specific to an operating system, JAVA language-based software applications are executable by any JAVA VM irrespective of the underlying operating system. The disadvantage of this approach is that the software application is dependent on the JVM to interface with the operating system and can not access functionality not provided by the JVM. For example, the JVM may not provide a JAVA-based software application access to certain low-level networking capabilities provided by the operating system, which would be accessible to software applications written for a specific operating system.

It is known in the art to generate unique identifiers (UID), also referred to as global unique identifiers (GUID) and universal unique identifiers (UUID), using executable software to obtain unique data stored on a computer system. However, prior approaches to generating a UID of which the inventor is aware require the use of platform-specific information to generate a UID.

Most computer systems include an ethernet interface card for enabling network access from the computer system to a network. Because of an agreed to licensing system between ethernet card manufacturers, each ethernet card includes a unique media access control (MAC) address as part of the ethernet card hardware. Because the MAC address is defined to be unique between ethernet cards, most frequently the MAC address, or a generated MAC address, e.g., a pseudo-MAC address, is used as the basis for the UID. At a minimum, existing UID generation mechanisms use the MAC address as an input in combination with other parameters.

One difficulty with using platform-specific information to generate a UID is that in order to access such platform-specific information the UID generation mechanism must be aware of the platform-specific information and include a method to access the information for each platform on which the UID is to be generated. UID generation software developed for one platform, e.g., a personal computer executing Microsoft Windows operating system, will not be able to operate on another platform, e.g., a personal computer executing HP-UX operating system, as described above.

Executable software written for one platform, i.e., a particular processor and operating system capability, is not transferable to another platform, e.g., Microsoft Windows-based executables will not execute on an HP-UX Unix operating system.

One solution to this problem is the use of an intermediate operating environment such as Sun Microsystems' JAVA Virtual Machine (JVM) and the corresponding JAVA programming language. Under this approach, an intermediate operating environment is written for execution on a particular platform. Because the programming interface to the intermediate operating environment is standard across platforms, software written for an intermediate operating environment on one given platform is executable without change on the same intermediate operating environment of a different platform. The JVM is one such intermediate operating environment and the JAVA programming language provides the common programming interface for software developed for the JVM. Through the use of the JVM and the JAVA programming language, software may be written one time on one platform and thereafter be executable without change on other platforms having a JVM.

JAVA is a programming language designed to enable generation of software applications capable of executing on all platforms without modification. JAVA was originally developed in 1991 by Sun Microsystems, Inc. as a language for embedded applications. JAVA is an interpreted language wherein the source code is compiled into an intermediate language called bytecode. The bytecode is converted or interpreted into machine code at runtime. Thus, JAVA programs are not dependent on any specific hardware and run in any computer having a JAVA virtual machine.

Hardware Overview

FIG. 1 is a block diagram illustrating an exemplary computer system 100. The block diagram of computer system 100 is also applicable to mini-mainframes, servers, handhelds and the like.

Computer 100 includes a bus 102 or other communication mechanism for communicating information, and a processor 104 coupled with the bus 102 for processing information. Computer 100 also includes a main memory 106, such as a random access memory (RAM) or other dynamic storage device, coupled to the bus 102 for storing instructions to be executed by processor 104. Main memory 106 also may be used for storing temporary variables or other intermediate information during execution of instructions to be executed by processor 104. Computer 100 further includes a read only memory (ROM) 108 or other static storage device coupled to the bus 102 for storing static information and instructions for the processor 104. A storage device 110, such as a hard disk drive, is provided and coupled to the bus 102 for storing instructions, temporary variables, and other intermediate information.

Computer 100 may be coupled via the bus 102 to a display 112, such as a flat panel display, for displaying an interface to a user. An input device 114, such as a keyboard including alphanumeric and function keys, is coupled to the bus 102 for communicating information and command selections to the processor 104. Another type of user input device is cursor control 116, such as a stylus, pen, mouse, a trackball, or cursor direction keys for communicating direction information and command selections to processor 104 and for controlling cursor movement on the display 112. This input device typically has two degrees of freedom in two axes, a first axis (e.g., x) and a second axis (e.g., y) allowing the device to specify positions in a plane.

Sequences of instructions may be read into main memory 106 from another computer-readable medium, such as storage device 110; however, the computer-readable medium is not limited to devices such as storage device 110. For example, the computer-readable medium may include a floppy disk, a flexible disk, hard disk, magnetic tape, or any other magnetic medium, a compact disc-read only memory (CD-ROM), any other optical medium, a random access memory (RAM), a programmable read only memory (PROM), an erasable PROM (EPROM), a Flash-EPROM, any other memory chip or cartridge, or any other medium from which a computer can read. Execution of the sequences of instructions contained in the main memory 106 causes the processor 104 to perform process steps. In alternative embodiments, hard-wired circuitry may be used in place of or in combination with computer software instructions.

Computer 100 also includes a communication interface 118 coupled to the bus 102 and providing two-way data communication as is known in the art. For example, communication interface 118 may be an integrated services digital network (ISDN) card, a digital subscriber line (DSL) card, or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals which carry digital data streams representing various types of information. For example, two or more computers 100 may be networked together in a conventional manner with each using the communication interface 118.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals which carry digital data streams. The signals through the various networks and the signals on network link 110 and through communication interface 118, which carry the digital data to and from computer 100, are exemplary forms of carrier waves transporting the information.

Computer 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution. In this manner, computer 100 may obtain application code in the form of a carrier wave.

FIG. 2 is a high level block diagram depicting a layered view of a computer system hardware and software architecture 200. The architecture 200 includes computer hardware 100 (described in conjunction with FIG. 1 above), and an operating system 202, stored in ROM 108, main memory 106, or storage device 110. The processor 104 executes operating system 202 instructions from memory 106, ROM 108, or storage device 110. Instructions for a platform-specific executable 204, as is known in the art, are executed by the processor 104 and access functionality provided by the operating system 202. For example, the platform-specific executable 204 may be a word processor, a web browser, a spreadsheet program, an email program, or other software executables. Platform-specific executable 204 is also referred to as a native program. An example operating system 202 is HP-UX available from Hewlett-Packard Development Company, LLP.

An intermediate operating environment, i.e., a virtual machine 206, instructions are executed by processor 104 and cause the processor to access functionality provided by the operating system 202, e.g., function calls or method invocations. Virtual machine 206 executes a non-platform-specific (NPS) executable 208, i.e., a non-native program, for example a JAVA-based program, instructions to provide additional functionality on computer 100. As described above, an example virtual machine 206 is the JAVA virtual machine available from Sun Microsystems, Inc.

According to an embodiment of the present invention, the virtual machine 206 is the only component of the software architecture which must be customized for each specific hardware 100 and operating system 202 combination. That is, it is not necessary to customize the NPS executable 208 for a particular processor, graphics interface device, or other computer hardware or for a particular operating system 202 version or manufacturer. In contrast, each platform, i.e., operating system 202 and hardware 100 combination, requires a different version of the platform-specific executable 204.

The NPS executable 208 communicates via standard virtual machine language methods known to those skilled in the art. Having been designed according to the software architecture of the present invention, the NPS executable 208 is fully portable to another computer having a virtual machine 206, and an operating system 200. Each of the above components are typically standard on any computing device intended for direct human interaction, including desktops, laptops, servers, and handheld or embedded devices. The NPS executable 208 will execute on such a system regardless of the particular type of any of the abovementioned components.

SUMMARY

It is therefore an object of the present invention to provide a method of and system for generating a unique identifier without requiring platform-specific software.

Another object of the present invention is to provide such a method and system executable without change on a number of different platforms.

The present invention provides a method of generating a unique identifier without requiring platform-specific software. In response to an event occurrence on a computer system, execution of the method retrieves an event timestamp from an intermediate operating environment on the computer system. Further execution of the method retrieves a system name and a hash value from the intermediate operating environment on the computer system. The combination of the system name, event timestamp, and hash value creates a unique identifier uniquely identifying the intermediate operating environment on the computer system without requiring platform-specific software.

A method aspect of generating a unique identifier in non-platform-specific software includes, in response to an event occurring, retrieving an event timestamp from an intermediate operating environment on the computer system. A system name is retrieved from the intermediate operating environment. A hash value is retrieved from the intermediate operating environment. The system name, event timestamp, and hash value are combined to create a unique identifier uniquely identifying the intermediate operating environment on the computer system without requiring platform-specific software.

A computer-readable medium aspect includes instructions for execution by a processor to cause the processor to retrieve an event timestamp from an intermediate operating environment in response to an event occurrence determined by the intermediate operating environment. The processor retrieves a system name and a hash value from the intermediate operating environment and combines the system name, hash value, and event timestamp to generate the unique identifier.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

An embodiment according to the present invention generates a unique identifier without requiring platform-specific software.

Figure 1:
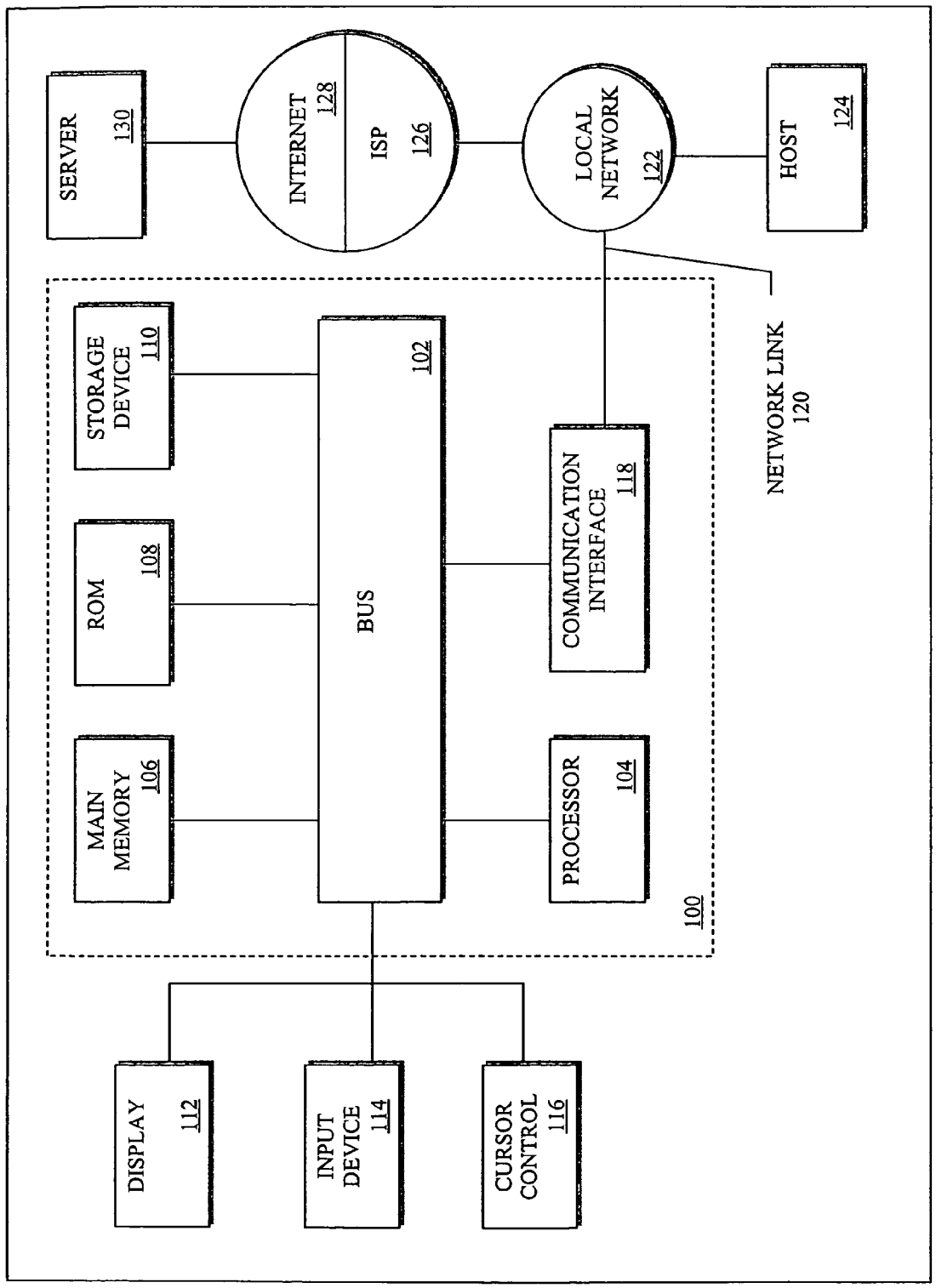
FIG. 1 is a high-level block diagram of a computer system usable in conjunction with an embodiment of the present invention.
Figure 2:
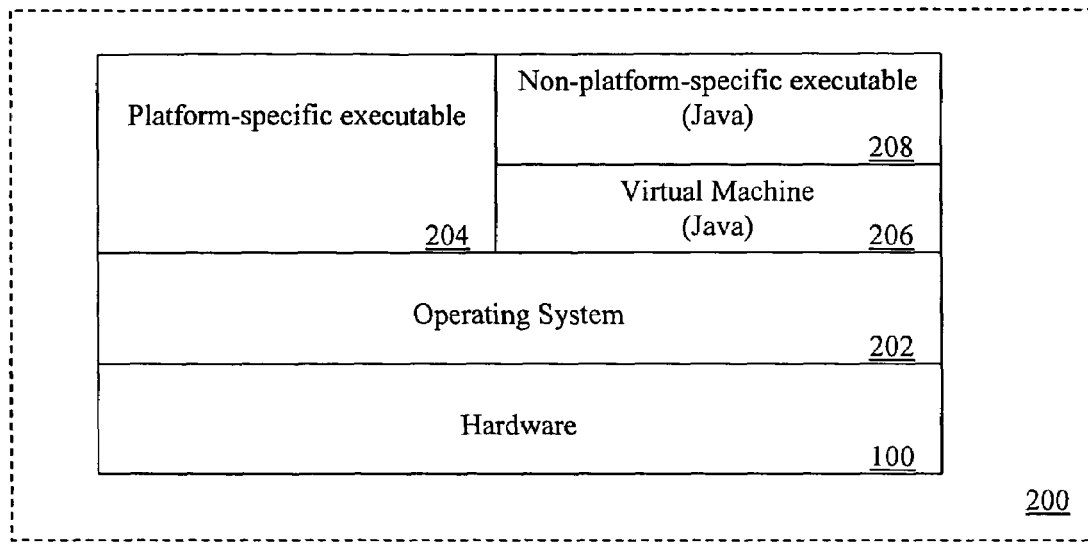
FIG. 2 is a block diagram of a high level form of a computer system hardware and software architecture.

FIG. 1, described above, is a block diagram illustrating an exemplary computer system 100, upon which an embodiment of the invention may be implemented. The present invention is usable with currently available computer systems, and is also applicable to mini-mainframes, servers, handhelds and the like.

The invention is related to the use of computer 100, such as the depicted computer of FIG. 1, to store and access sequences of instructions and information causing the computer 100 to generate a unique identifier without requiring platform-specific software. According to one embodiment of the invention, a unique identifier is generated by computer 100 in response to processor 104 executing sequences of instructions contained in main memory 106 in response to input received via input device 114, cursor control 116, or communication interface 118. As described above, such instructions may be read into main memory 106 from another computer-readable medium, such as storage device 110.

Figure 4:
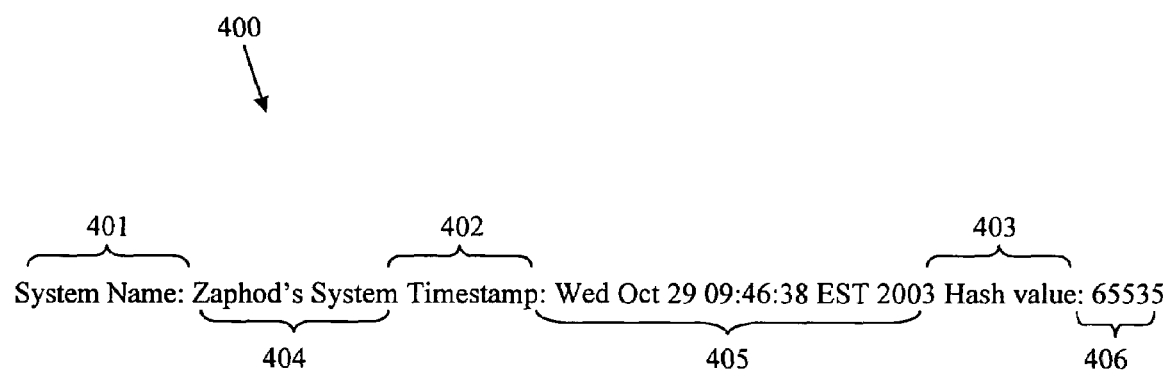
FIG. 4 is an example of a unique identifier generated in accordance with an embodiment of the present invention.
Figure 3:
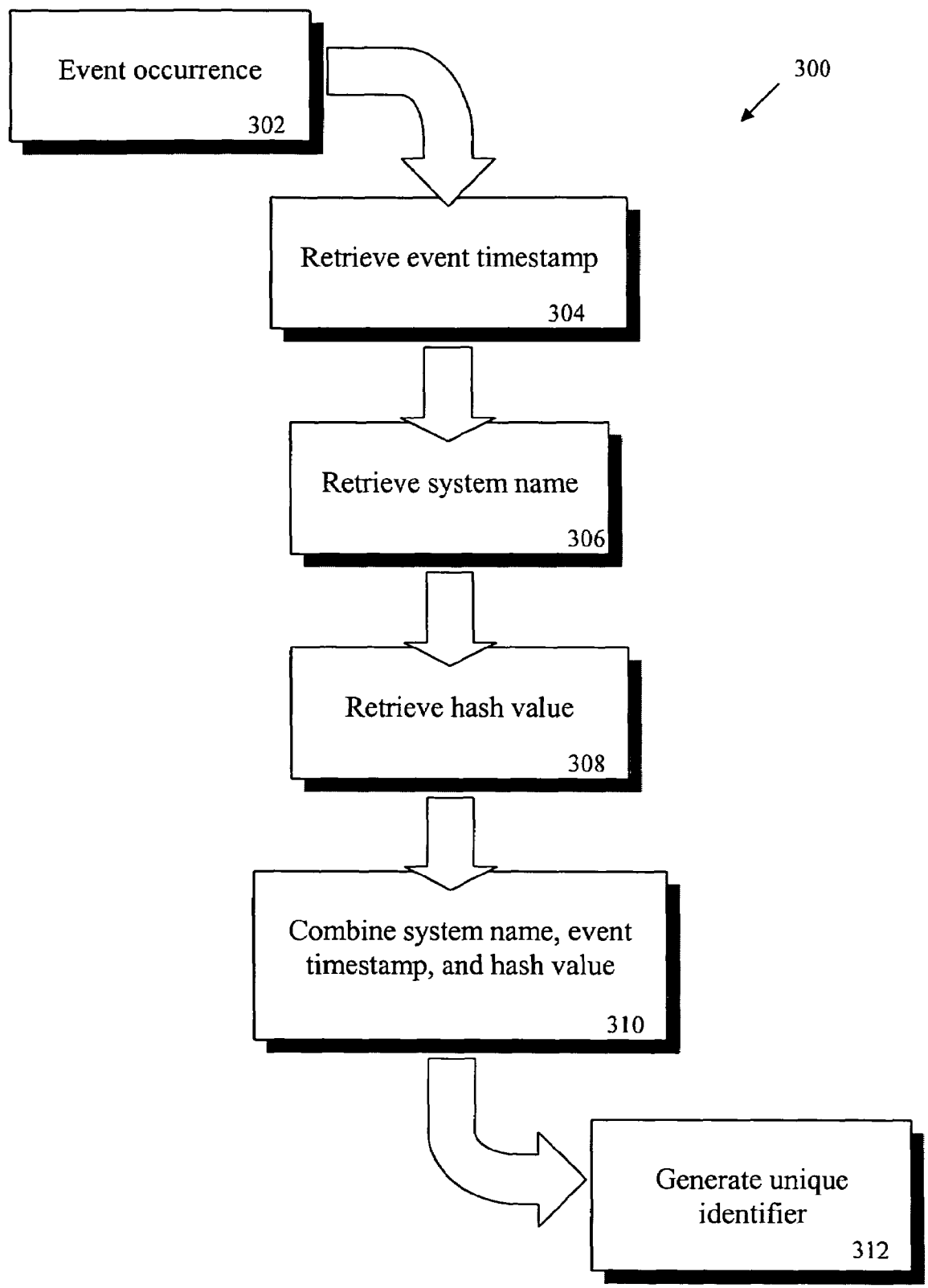
FIG. 3 is a process flow diagram an embodiment according to the present invention.

Occurrence of an event causes execution of the NPS executable 208 designed using the software architecture of the present invention, processor 104 performs the steps depicted in the process flow 300 of FIG. 3 to generate a unique identifier, such as the one depicted in FIG. 4. FIG. 3 is now described in detail.

An event occurrence at step 302 begins the execution of the process flow 300 of the NPS executable 208 by virtual machine 206 being executed by processor 104. At step 304, execution of the NPS executable 208 causes the virtual machine 206 to generate an event timestamp. The event timestamp specifies the time of the event occurrence and in a specific embodiment includes the date of the occurrence, as well. For example, "Wed Oct 29 09:46:38 EST 2003" as depicted in FIG. 4. In alternative embodiments, the timestamp may include more or less significant digits to increase or decrease the detail of the timestamp information. The event timestamp is stored in memory 106. The process flow proceeds to step 306.

At step 306, virtual machine 206 executing NPS executable 208 retrieves the system name as specified in the operating system 202. The system name may be specified by a user of the platform 200, e.g., "Zaphod's System". The system name retrieved is stored in memory 106. The process flow proceeds to step 308.

At step 308, execution of the NPS executable 208 causes the virtual machine 206 to generate a hash value. The hash value is a reference provided by the virtual machine 206 and is unique to any object within the virtual machine. For example, the value is usually an address or offset into an allocation table identifying a given object. In one particular embodiment, the hash value is based on an object created in response to the event causing generation of the UID. The hash value is stored in memory 106. The process flow proceeds to step 310.

At step 310, execution of the NPS executable 208 causes the virtual machine 206 to combine the system name, event timestamp, and hash value. The combination may be a concatenation of the information or other method of combining the information enabling later retrieval of the separate pieces of information from the combination. Alternate embodiments may employ encryption and/or compression techniques known to persons of skill in the art to the combined information.

Combination of the information results in the generation of the unique identifier in step 312.

FIG. 4 is an example of a unique identifier generated by an embodiment according to the present invention. Unique identifier 400 includes a system name field label 401, a timestamp field label 402, and a hash value field label 403 and corresponding system name value 404, timestamp value 405, and hash value value 406. It is to be understood that in alternate embodiments, field labels 401, 402, and 403 may be omitted without departing from the spirit and scope of the present invention. Further, the order of the fields 401-403 and values 404-406 may be changed without affecting operation of the present invention.

Having been designed according to the software architecture of the present invention, the NPS executable 208 is fully portable to another computer having a virtual machine 206, and an operating system 200 and is able to generate a unique identifier without requiring platform specific instructions. The NPS executable 208 will execute on such a system regardless of the particular type of any of the abovementioned components.

Advantageously, a unique identifier generated according to an embodiment of the present invention requires no platform specific instructions and is executable on any platform having a compatible intermediate operating environment. The generated identifiers have a high probability of uniqueness. In order for identical identifiers to be generated on separate platforms 200, the generating event would have to occur at the same time, the system names would have to be identical, and the hash value would have to match. Combining the above information, i.e., system name, event timestamp, and hash value, results in an extremely low probability of duplicate identifiers being generated on different platforms. In one particular embodiment, unique identifiers may be used to differentiate support requests generated by different platforms or the same platform.

Further advantageously, because platform-specific UID software is not required, different versions for each platform to be supported are not required, as described above. Additionally, maintenance and support requirements, as well as development requirements, are reduced, e.g., it is less costly to create, maintain, and support a single version than multiple versions. Each additional version would require creation, maintenance, and support for an installation process, testing, validation, and ongoing technical support for the version on each platform.

It will be understood by persons of skill in the art that the JAVA virtual machine and programming language are exemplary in nature and other platform-neutral intermediate operating environments and/or languages are useable in place thereof.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of generating a unique identifier in non-platform-specific software, comprising the steps of:
   in response to an event occurring on a computer system, retrieving an event timestamp from an intermediate operating environment on the computer system, wherein the intermediate operating environment is a virtual machine;
   retrieving a system name from the intermediate operating environment on the computer system;
   retrieving a hash value from the intermediate operating environment on the computer system; and
   combining the system name, event timestamp, and hash value to create a unique identifier for uniquely identifying the intermediate operating environment on the computer system without requiring platform-specific software.

2. The method of claim 1, further comprising the step of: transmitting event information comprising the unique identifier to another computer system.

3. The method of claim 1, wherein the unique identifier is created without using a media access control address.

4. The method of claim 1, further comprising the step of: storing event information on the computer system.

5. The method of claim 4, wherein the event information includes the unique identifier.

6. The method of claim 1, wherein the hash value is a hash code value for an object in the intermediate operating environment.

7. The method of claim 6, wherein the object is unique within the intermediate operating environment.

8. A computer storage medium comprising:
   at least one sequence of intermediate operating environment instructions for generating a unique identifier in non-platform-specific software, wherein the intermediate operating environment is a virtual machine and execution of the instructions by the intermediate operating environment causes the environment to:
   responsive to an event occurrence determined by the intermediate operating environment,
   retrieve an event timestamp from the intermediate operating environment;
   retrieve a system name from the intermediate operating environment;
   retrieve a hash value from the intermediate operating environment; and
   combine the retrieved event timestamp, system name, and hash value to create a unique identifier for uniquely identifying the intermediate operating environment on a computer system without requiring platform-specific software.

9. The computer storage medium of claim 8, further comprising a sequence of intermediate operating environment instructions which, when executed by the intermediate operating environment causes the environment to:
   transmit event information including the unique identifier to another computer system.

10. The computer storage medium of claim 8, wherein the hash value is a hash code value for an object in the intermediate operating environment.

11. The computer storage medium of claim 10, wherein the object is unique within the intermediate operating environment.

12. A computer system for generating a unique identifier in non-platform-specific software, comprising:
    a processor; and
    a memory coupled to the processor, the memory having stored therein a processor-specific operating system, an intermediate operating environment executable on the operating system, wherein the intermediate operating environment is a virtual machine, and sequences of intermediate operating environment instructions for generating a unique identifier in non-platform-specific software, which when executed by the intermediate operating environment, cause the intermediate operating environment to perform the steps of:
    in response to an event occurring on the computer system, retrieving an event timestamp from the intermediate operating environment on the computer system;
    retrieving a system name from the intermediate operating environment on the computer system;
    retrieving a hash value from the intermediate operating environment on the computer system; and
    combining the system name, event timestamp, and hash value to create a unique identifier for uniquely identifying the intermediate operating environment on the computer system without requiring platform-specific software.

13. The computer system of claim 12, further comprising a sequence of intermediate operating environment instructions which, when executed by the intermediate operating environment, cause the intermediate operating environment to perform the step of:

transmit event information including the unique identifier to another computer system.

14. The computer system of claim 12, wherein the hash value is a hash code value for an object in the intermediate operating environment.

15. The computer system of claim 14, wherein the object is unique within the intermediate operating environment.

* * * * *